United States Patent
Kneckt et al.

(10) Patent No.: US 9,198,197 B2
(45) Date of Patent: Nov. 24, 2015

(54) DETERMINING MAXIMUM PACKET DURATION

(71) Applicant: Nokia Technologies Oy, Espoo (FI)

(72) Inventors: Jarkko Lauri Sakari Kneckt, Espoo (FI); Olli Alanen, Vantaa (FI)

(73) Assignee: Nokia Technologies Oy, Espoo (FI)

( * ) Notice: Subject to any disclaimer, the term of this patent is extended or adjusted under 35 U.S.C. 154(b) by 143 days.

(21) Appl. No.: 14/081,463

(22) Filed: Nov. 15, 2013

(65) Prior Publication Data

US 2015/0139083 A1    May 21, 2015

(51) Int. Cl.
  *H04W 74/08* (2009.01)
  *H04L 1/18* (2006.01)
  *H04L 1/00* (2006.01)
  *H04W 84/12* (2009.01)

(52) U.S. Cl.
  CPC ......... *H04W 74/0816* (2013.01); *H04L 1/0007* (2013.01); *H04L 1/1887* (2013.01); *H04W 84/12* (2013.01)

(58) Field of Classification Search
  CPC .............. H04W 74/0816; H04W 74/0825; H04W 74/0841; H04W 74/085; H04W 74/0858; H04W 72/04; H04W 72/0406; H04W 72/08; H04W 72/082; H04W 72/085; H04W 72/12; H04W 72/1226; H04W 72/1231; H04W 72/1242
  See application file for complete search history.

(56) References Cited

U.S. PATENT DOCUMENTS

| | | | |
|---|---|---|---|
| 7,191,370 B2 * | 3/2007 | Yokosato | H04L 1/0007 370/235 |
| 2006/0187964 A1 | 8/2006 | Li et al. | |
| 2007/0058661 A1 * | 3/2007 | Chow | H04L 12/417 370/445 |
| 2007/0097867 A1 | 5/2007 | Kneckt et al. | |
| 2008/0298317 A1 * | 12/2008 | Yang | H04B 7/0632 370/329 |
| 2011/0122780 A1 | 5/2011 | Nieminen et al. | |
| 2012/0314636 A1 * | 12/2012 | Liu | H04W 28/065 370/311 |

FOREIGN PATENT DOCUMENTS

EP    0872979 A2    10/1998

OTHER PUBLICATIONS

Lin et al., "Machine-Learning-Based Adaptive Approach for Frame-Size Optimization in Wireless LAN Environments", IEEE Transactions on Vehicular Technology, vol. 58, No. 9, Nov. 2009, pp. 5060-5073.
Skordoulis et al., "IEEE 802.11n MAC Frame Aggregation Mechanisms for Next-Generation High-Throughput WLANs", IEEE Wireless Communications, vol. 15, No. 1, Feb. 2008, pp. 40-47.

(Continued)

*Primary Examiner* — Chi H Pham
*Assistant Examiner* — Weibin Huang
(74) *Attorney, Agent, or Firm* — Nokia Technologies Oy

(57) ABSTRACT

There is provided a method comprising: determining, by a transmitter node, maximum packet duration for a data packet to be transmitted, wherein the data packet comprises a plurality of data units; causing a transmission of the data packet; causing a reception of an acknowledgement frame indicating a failed reception of multiple consecutive data units of the transmitted data packet; determining a transmission duration during which the failed multiple consecutive data units were transmitted; and determining whether or not to adjust the maximum packet duration for upcoming data packet transmissions on the basis of the determined transmission duration.

19 Claims, 5 Drawing Sheets

(56) References Cited

OTHER PUBLICATIONS

Sun et al.,"IEEE 802.11ah: A Long Range 802.11 WLAN At Sub 1 GHz", Journal of ICT Standardization, vol. 1, May 14, 2013, pp. 83-108.

International Search Report and Written Opinion received for corresponding Patent Cooperation Treaty Application No. PCT/FI2014/050746, dated Jan. 21, 2015, 14 pages.

* cited by examiner

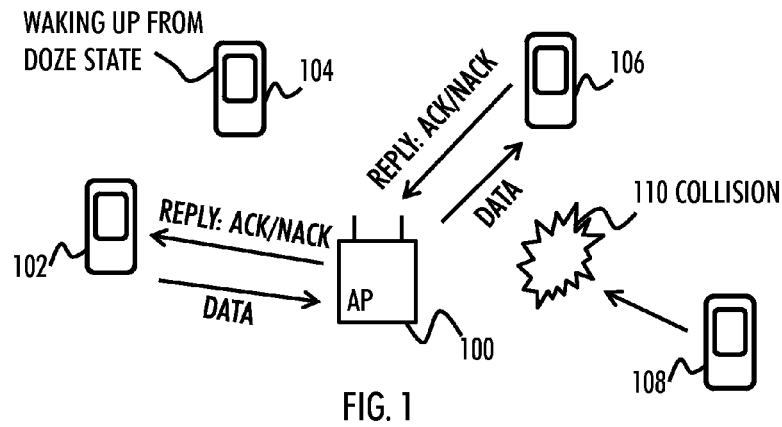

FIG. 1

200 DETERMINING, BY A TRANSMITTER NODE, MAXIMUM PACKET DURATION FOR A DATA PACKET TO BE TRANSMITTED, WHEREIN THE DATA PACKET COMPRISES A PLURALITY OF DATA UNITS

202 CAUSING A TRANSMISSION OF THE DATA PACKET

204 CAUSING A RECEPTION OF AN ACKNOWLEDGEMENT FRAME INDICATING A FAILED RECEPTION OF MULTIPLE CONSECUTIVE DATA UNITS OF THE TRANSMITTED DATA PACKET

206 DETERMINING A TRANSMISSION DURATION DURING WHICH THE FAILED MULTIPLE CONSECUTIVE DATA UNITS WERE TRANSMITTED

208 DETERMINING WHETHER OR NOT TO ADJUST THE MAXIMUM PACKET DURATION FOR UPCOMING DATA PACKET TRANSMISSIONS ON THE BASIS OF THE DETERMINED TRANSMISSION DURATION

FIG. 2

DETERMINING MAXIMUM PACKET DURATION

FIELD

The invention relates generally to improving communication efficiency in a wireless access network.

BACKGROUND

Typically wireless access networks perform better when the traffic load is small or moderate. Also when the density of the networks and terminals is small, the wireless access networks perform well. However, with a high number of users or a high traffic load, the communication efficiency may decrease. This may be, e.g., due to collisions of transmissions from different users.

BRIEF DESCRIPTION OF THE INVENTION

According to an aspect of the invention, there is provided a method as specified in claim 1.

According to an aspect of the invention, there are provided apparatuses as specified in claims 10.

According to an aspect of the invention, there is provided a computer program product as specified in claim 19.

According to an aspect of the invention, there is provided a computer-readable distribution medium carrying the above-mentioned computer program product.

According to an aspect of the invention, there is provided an apparatus comprising means for performing any of the embodiments as described in the appended claims.

Embodiments of the invention are defined in the dependent claims

LIST OF THE DRAWINGS

In the following, the invention will be described in greater detail with reference to the embodiments and the accompanying drawings, in which FIG. 1 presents a wireless access network, according to an embodiment;

FIG. 2 shows a method, according to an embodiment;

DESCRIPTION OF EMBODIMENTS

Figure 3A:
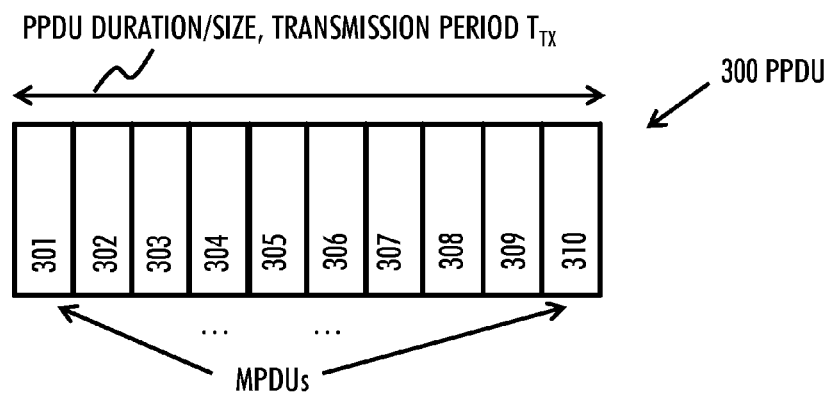
FIG. 3A shows an example data packet, according to an embodiment.

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

The number of IEEE 802.11-enabled mobile devices is increasing. The IEEE 802.11 is a set of standards for implementing wireless local area network (WLAN), also known as the Wi-Fi. Such IEEE 802.11-enabled stations (STA), e.g. user terminals/equipment 102-108 in FIG. 1, may associate and communicate with an access node/point (AP) 100. The STAs 102-108 may comprise a mobile phone, a palm computer, a wrist computer, a laptop, a personal computer, or any device capable to access the wireless radio access network, such as the WLAN. The access node 100 may be a WLAN (IEEE 802.11) access point (e.g. Wi-Fi base stations), for example. Although in the following WLAN is used for the simplicity of the description, the embodiments may be applicable to other types of wireless access networks.

As the number of users (devices) is increasing, the requirements for communication efficiency in terms of reliability and throughput become more difficult to reach. For example, data transmission from the STA 108 may collide with the on-going data transmission between the STA 102 and the STA 106 (via the AP 100), as shown with a reference numeral 110 in FIG. 1. In order to avoid or at least to mitigate the problem of interference/collisions, the WLAN uses Enhanced Distributed Channel Access (EDCA) with physical carrier sensing, such as a Clear Channel Assessment (CCA), and virtual carrier sensing, such as a Network Allocation Vector (NAV). As such, when the physical and virtual carrier sensing indicate an idle channel, the STA 102-108 may reduce the value of the back-off. When the back-off is zero, the device (STA) 102-108 may obtain a transmission opportunity (TXOP) to transmit data. The physical and virtual carrier sensing try to avoid simultaneous transmissions that cause interference, e.g., collisions, to each other. The protection level thus depends on the carrier sensing mechanism applied, distance between the transmitters and the intended recipients, network topologies, antenna technology, amount of traffic, etc.

However, a power saving capable STA, such as the STA 104 may go to sleep (i.e. to a power save mode, also known as a doze mode/state). When a mobile device 104 is using the power save (e.g. is in the doze mode), the device 104 is not aware of the possibly on-going transmissions. In other words the STA 104 may rely only on the physical carrier sensing, such as the CCA. Likewise, if directive transmissions are applied, the NAV or CCA information may not be broadcasted to all devices 104. As a consequence, when directed transmissions are being used, those devices that disturb the receiver of the directed transmission may not be aware of the on-going transmission(s) and, thus, cause interference to the transmission(s).

To improve the protection of the on-going transmissions (e.g. to avoid collisions), the devices 104 and 108 should be able to detect the on-going transmissions, such as the transmission between the STAs 102 and 106. However, e.g. the power saving STAs 104 may not obtain the NAV information from the on-going data transmissions. This may be, e.g., due to the number of data streams, due to different modulation and coding schemes (MCS) being applied, as well as due to possible directive transmissions which may make the data frames of the on-going transmissions hard to detect by a STA 104. It may also be noted that typically a link adaptation procedure tries to adapt the MCS to a specific interference level. However, in a free (unlicensed) frequency spectrum, such as the one used by the WLAN, the interference level may vary significantly in the channel. As a result, the NAV information updates may be undetected by some of the STAs 104, 108 and, consequently, data transmission from the power saving STAs 104 and other STAs 108 that did not receive the NAV information may collide with the on-going transmissions.

Therefore, there is needed a solution to improve the communication efficiency and reliability by increasing the protection level of the on-going transmissions. This may take place by enabling a transmitter to define a maximum duration before a respond (MDBR) from a receiver/responder of an on-going transmission. In other words, the frequency/periodicity of responses (i.e. how often the responses are transmitted) from a receiver of a data transfer may be defined. It may be noted that the STAs 104, 108 may more easily detect and decode the responses, such as an acknowledgement (ACK)-frame or a non-ACK (NACK)-frame from the receiver, than the data transmissions from the transmitter. The responses (e.g. the ACK/NACK) may also carry information related to the channel reservation, such as a NAV update. Thus, the response from the receiver may help in protecting the on-going transmission by indicating that the channel is reserved for the duration of the indicated NAV. Therefore, by applying an appropriate frequency for the responses carrying, e.g., the NAV updates, the STAs 104 and 108 may be more likely to detect the NAV update and to restrain from transmissions. In this way the frequent channel occupancy information updates may help in avoiding simultaneous transmissions that would cause interference and collisions of packets. Further, this may help to maintain a constant interference level which may enable the link adaptation to adjust the MCS more precisely according to the current link performance. This may improve the throughput of the system.

Accordingly, it is proposed that, as shown in FIG. 2, a transmitter node may in step 200 determine maximum packet duration for a data packet to be transmitted. This initially determined maximum packet duration may be predefined according to the applied transmission protocol, based on MCS, estimated traffic, mathematical simulations, empirical derivation, etc. As on example, the maximum packet duration may initially be between 0.5 and 0.8 milliseconds.

The type of the data packet may depend on the used transmission protocol, for example. In general, the embodiments are applicable to any transmission technique/protocol. However, in an embodiment, the data packet to be transmitted is a Physical Layer Convergence Procedure (PLCP) Protocol Data Unit (PPDU) of an IEEE 802.11 wireless access network. Thus, the packet duration may be the PPDU duration. The duration may be defined by determining the size/length of the PPDU to be transmitted. An example data packet is shown in FIG. 3A, wherein the PPDU 300 is depicted. The bidirectional arrow in FIG. 3A shows the length/size/duration of the PPDU 300.

The data packet may comprise a plurality of data units. Although the data units may be seen as any sub-parts within the transmitted data packet, in an embodiment each data unit in the data packet is a MAC Protocol Data Unit (MPDU) of an IEEE 802.11 wireless access network.

Although in the following the terms PPDU and MPDU may be used for simplicity, the embodiments may as well be applicable to other types of data packets comprising many data units. FIG. 3A also shows how the PPDU 300 may comprise multiple MPDUs 301-310.

The transmitter node may, in an embodiment, be a non-AP STA, such as the STA 102 transmitting data to the STA 106, for example. In another embodiment, the transmitter node is an access point or access node, such as the AP 100. In an embodiment, the transmitter node operates according to the wireless local area network of the IEEE 802.11.

In step 202, the transmitter 102 may cause a transmission of the PPDU comprising the plurality of MPDUs. The data packet may be transmitted to a receiver, such as to the STA 106 of FIG. 1. The transmission may take place within a transmission period $T_{TX}$. The transmission period $T_{TX}$ needed for transmitting the packet may depend on the initial maximum packet duration.

Figure 3B:
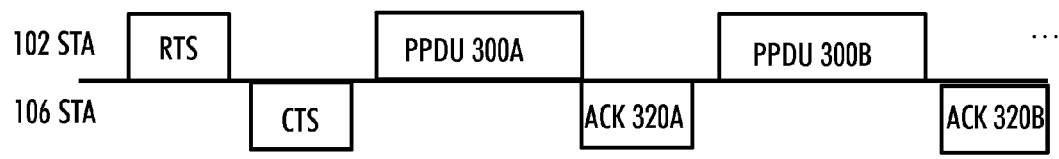
FIG. 3B shows an example negotiation during data transmission, according to an embodiment.

In an embodiment, the transmitter 102 may use ready-to-send/clear-to-send (RTS/CTS) signaling, as shown in FIG. 3B. This may be in order to overcome possible hidden terminal problems and to reduce the likelihood of transmission collisions 110. Also enhanced distributed channel access (EDCA) parameters may be adjusted to reduce collisions. These parameters may comprise e.g. a contention window (CW) minimum and maximum, an arbitrary inter-frame space (AIFS) and a transmission opportunity (TXOP) limit setting a time period during which the transmitter 102 is allowed to transmit without contention.

The transmitter 102 may detect if no acknowledgement or no block acknowledgement is received from the receiver (responder) 106 for the transmitted data packet 300. The lack of ACK may be because the reception of the synchronization sequence or the PLOP header of the data PPDU 300 by the STA 106 was not successful, none of the transmitted MPDUs 301-310 of the transmitted PPDU 300 was received correctly by the STA 106, and/or the reception of the ACK frame by the STA 102 from the receiver 106 has failed. However, if one or more of the MPDUs 301-310 in the PPDU 300 was received correctly by the receiver 106, the receiver 106 may transmit and the STA 102 may receive the ACK frame in step 204, such as a block ACK, that indicates which one(s) of the MPDUs 301-310 was/were received correctly by the receiving STA 106 and which one(s) was/were not received (failed reception) by the receiving STA 106. This is shown in FIG. 3B in which the receiver STA 106 transmits an ACK or a block ACK frame 320A, 320B (commonly referred to as ACK 320) after each transmitted PPDU 300A, 300B (commonly referred to as PPDU 300).

Figure 4A:
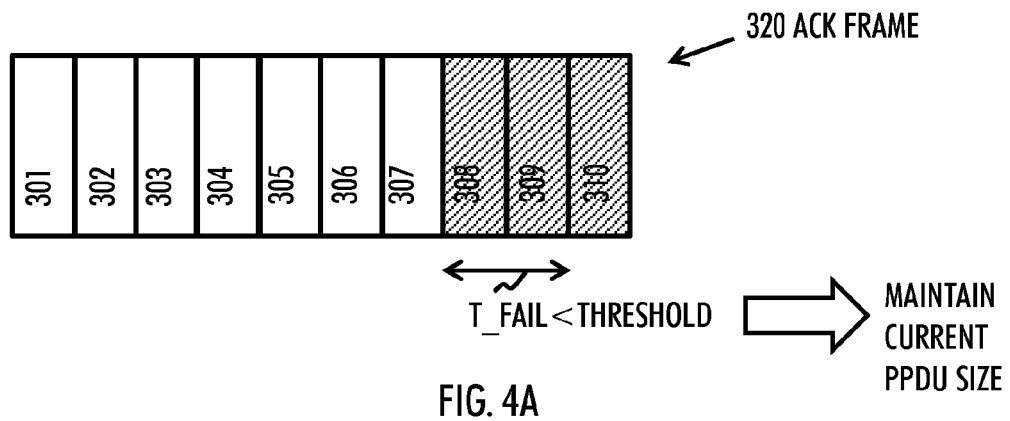
FIGS. 4A and 4B illustrate examples of acknowledgement frames, according to some embodiments.
Figure 4B:
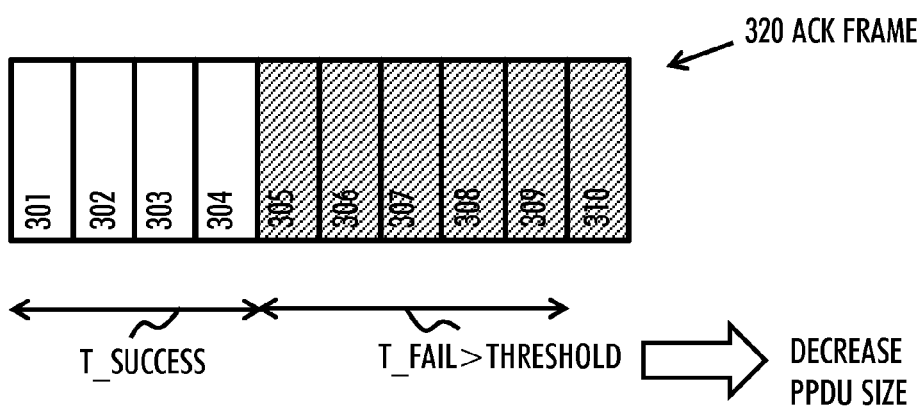

Let us now assume that at least some consecutive MPDUs (data units) were not received correctly by the receiving STA 106. That is the received ACK 320 may indicate a failed reception of multiple consecutive data units of the transmitted data packet. This is shown in FIGS. 4A and 4B. In both figures, the ACK frame 320 shows that at least some consecutive (adjacent) data units were not received correctly by the receiver 106. In the example FIG. 4A, the missed data units are the MPDUs 308-310, and in the example of FIG. 4B, the missed data units are the MPDUs 305-310. The missed data units are marked with blocks having right leaning diagonal lines, whereas the correctly received data units are marked with white blocks. As some MPDUs are not been received correctly by the receiver STA 106, the transmitter STA 102 may consider that some third devices are not aware that the channel is being reserved. Consequently, these third device(s), such as the STA 104 and/or 108, may have started transmitting during the on-going communication between the STAs 102 and 106. This may lead to collided transmissions 110 and inefficiency in the communication.

In step 206, the transmitter STA 102 may determine a transmission duration $T_{FAIL}$ during which the failed multiple consecutive data units were transmitted. The time interval $T_{FAIL}$ may be comprised within the total transmission period $T_{TX}$ of the data packet 300. The transmitter 102 may be aware of the transmission time instants for each of the MPDUs 301-310 of the PPDU 300. By receiving information that, e.g., the reception of MPDUs 308-310 have been failed, the transmitter 102 may then determine, on the basis of the stored transmission times of the MPDUs 301-310, how long it took to transmit these three failed MPDUs 308-310. Thus, the transmitter STA 102 may be able to determine the $T_{FAIL}$.

In step 208, the STA 102 may then determine whether or not to adjust the maximum packet duration (e.g. the maximum PPDU duration) for upcoming data packet transmissions on the basis of the determined transmission duration $T_{FAIL}$. Such adjustment of the maximum PPDU size/length/duration may increase the communication efficiency of the wireless access network, as will be described below.

For example, it may be noted that, e.g., shortening of the transmitted PPDUs 300 may reduce the number of failed MPDU receptions during a transmission opportunity (TXOP). The negative effect caused by the increased ACK overhead (due to shortening of the PPDU size) may be smaller than the negative effect otherwise caused by a reduced physical (PHY) layer transmission rate or by the time wasted for the MPDU retransmissions. As one possible further advantage, smaller PPDU size may enable reduced MCS, which may be taken into account by the link adaptation in applying a smaller PHY rate in order to increase transmissions reliability.

Let us take a look on how the STA 102 may decide whether or not to adjust the maximum packet duration by referring to FIGS. 4A and 4B. In 4A, the interval $T_{FAIL}$ corresponds to the time interval for transmitting three consecutive MPDUs 308-310. In this case $T_{FAIL}$ may be relatively short. In an embodiment, upon detecting that the determined transmission duration $T_{FAIL}$ is lower than a predetermined threshold $T_{TH}$, the STA 102 may decide to maintain the current value of the maximum packet duration. That is, if the time $T_{FAIL}$ to transmit the failed MPDUs 308-310, whose reception failed, is small, e.g. within the transmission duration of the ACK 320 (single ACK or block ACK) or the RTS frame, the data transmitter STA 102 may assume that multiple receiver STAs are located closely and they are transmitting ACKs simultaneously during the data PPDU transmission. The STA 102 may determine that these simultaneous ACKs are the reason of the failed reception of the MPDUs 308-310 during the interval $T_{FAIL}$. The STA 102 may further consider that there are no close-by transmitters. In this case, the data transmitter STA 102 may decide not to react to these errors caused by the ACK/RTS transmissions. As a consequence, the STA 102 may keep the maximum PPDU duration the same. The STA 102 may thus keep on transmitting further PPDUs having the same size, for example.

However, in FIG. 4B, the determined $T_{FAIL}$ is longer, corresponding to the transmission duration of the MPDUs 305-310. Let us assume that this duration $T_{FAIL}$ exceeds the predetermined threshold $T_{TH}$. In this embodiment, upon detecting that the determined transmission duration $T_{FAIL}$ is higher than the predetermined threshold $T_{TH}$, the transmitter STA 102 may decide to reduce the value of the maximum packet duration. In other words, if the collisions take place over a longer interval, such as over an interval matching other data transmissions, then the missed MPDUs 305-310 may not be due to ACKs being transmitted from other receivers. In this case it is more likely that other transmitter(s) is/are transmitting during the on-going transmission. In such case, the transmitter STA 102 may transmit shorter PPDUs 300 to enable the receiver 106 to transmit ACKs more often and, thus, to allow the NAV information to be updated more often by devices in the proximity. Similarly the synchronization sequence and the PLOP headers are transmitted more frequently by the data transmitter 102, which also indicates the duration of the transmitted PPDU and set an extended interframe space (EIFS) protection around the data transmitter. Together these mechanisms may decrease the collisions in the network.

In an embodiment, the predetermined threshold $T_{TH}$ is set to value which is higher than estimated transmission duration of an acknowledgement frame. The estimated time duration needed for transmitting the ACK 320 may be between 40 and 100 microseconds, for example. Therefore, the $T_{TH}$ may be set to a value between 110 and 150 microseconds, for example. In another embodiment, the predetermined threshold $T_{TH}$ corresponds to the estimated transmission duration of the acknowledgement frame (e.g. the $T_{TH}$ may be set to a value of 100 microseconds). In this embodiment, the STA 102 may detect whether or not the determined maximum packet duration equals to or is lower than the $T_{TH}$. If the answer is positive, the current value of the maximum duration may be maintained. The exact value of the $T_{TH}$ may be based on mathematical modelling and/or empirical derivation, for example.

In an embodiment, if no MPDUs are missed by the receiver STA 106, the transmitter STA 102 may decide to increase the value of the maximum packet duration for the future data packet transmissions. This way the system throughput may be increased. However, if it is later recognized that failed MPDU receptions start to occur, the STA 102 may decide to reduce the maximum packet duration, as explained above.

It may be noted that it is the maximum packet duration which is maintained or adjusted. Thus, the transmitter 102 may still transmit any PPDUs 300 which are shorter than the defined maximum packet length. However, the transmitter 102 should not transmit any PPDUs 300 which are longer than the defined maximum duration. By defining the applicable maximum packet duration for transmissions, the transmitter 102 allows the receiver 106 to respond frequently enough, that is, after each PPDU 300 transmission. These responses (e.g. ACKs 320) may carry also information on how long the channel is reserved by the on-going communication to which the response refers to. Such information may be the NAV update, for example. Thus, third devices, such as the STAs 104, 108, may obtain NAV updates more frequently. This may ensure that the third devices do not start any transmissions which may collide with the on-going transmission. As such, the set maximum packet duration may be seen as a parameter defining the maximum duration before response (MDBR) which may be used to control the maximum duration between responses from the receiver 106.

In an embodiment, the MDBR (i.e. the maximum packet duration) may be included to the EDCA parameters. In an embodiment, the STA 102 may set different maximum packet duration for different access/priority categories, such as for different EDCA access categories. There may be, e.g., a separate MDBR value may be for each AC, and the same MDBR values are applied to all associated STAs capable of handling EDCA parameters. This may improve the flexibility of the system and enhance the communication efficiency in this manner. For example, high priority classes may apply more frequent responses (shorter PPDU size). In this way users having priority data to transmit may more easily be able to transmit the data without collisions.

In an embodiment, the transmitter STA 102 may detect what is the period during which the transmitter is allowed to transmit without contention, e.g. the duration of the TXOP (i.e. TXOPLimit). Thereafter, the transmitter STA 102 may determine the maximum packet duration at least partly on the basis of the period during which the transmitter is allowed to transmit. In this way the value of TXOPLimit may affect to the value of the MDBR (i.e. to the determination of the PPDU size). In an embodiment, if the TXOPLimit is set to "0", i.e. only a single data PPDU is allowed to be transmitted during one TXOP, the STA 102 may decide to keep on transmitting large PPDUs fitting inside the single TXOP. This may contribute to the communication efficiency as maximum amount of data is transmitted within one TXOP.

However, in an embodiment where the TXOPLimit is larger than zero (i.e. the STA 102 may be able to transmit more than one PPDU during one TXOP), the STA 102 may determine the maximum PPDU size so that the transmitted PPDUs 300 within the TXOP have even/uniform duration. This may contribute to the simplicity of the data transmission.

Further, in case the transmitter transmits multiple data packets during one contention-free transmission period (e.g. during one TXOP), the STA 102 may determine the maximum packet duration such that minimum amount of time in the contention-free transmission period is left unused. This may ensure that the TXOP duration is optimally used for data transmission. For example, let us assume that there is a payload for 1.5 ms transmission time according to the current MCS estimate and the TXOPLimit is 2.0 ms. The STA 102 may add the overhead of possible RTS/CTS transmissions (e.g. 120 microseconds) and the overhead of each ACK frame (e.g. 100 microseconds) to the estimated total transmission time. The transmitting device 102 may then compare different configurations and calculate the total transmission time that is consumed for each configuration, as shown in Table 1.

TABLE 1

Example comparison of different options for
the number of PPDUs to be used in one TXOP

| # of PPDUs in TXOP | Total TXOP duration [ms] | PPDU duration [ms] | Total overhead time [ms] | Total overhead [%] |
|---|---|---|---|---|
| 1 | 1.5 | 1.72 | 0.22 | 12.79 |
| 2 | 0.75 | 1.82 | 0.32 | 17.58 |
| 3 | 0.5 | 1.92 | 0.42 | 21.88 |
| 4 | 0.375 | 2.02 | 0.52 | 25.74 |

Let us assume that the STA 102 compares configurations in which the payload is divided into 1, 2, 3 or 4 equal sized PPDUs, as shown in Table 1. As a result of the comparison, the STA 102 may decide to transmit the payload in one, in two or in three 3 PPDUs, as the option with four PPDUs exceeds the TXOP limit. The STA 102 may for example try the option with only one PPDU, and if collisions occur (some MPDUs are not correctly received by the STA 106), the STA 102 may decide to shorten the PPDU duration and transmit the payload in two or three PPDUs.

In an embodiment, in case the durations of the transmitted PPDUs are not constant, the STA 102 may set maximum data packet duration to a value between 0.5 and 0.8 milliseconds. This may allow enough flexibility for the PPDU sizes, yet keeping the frequency of ACKs 320 from the receiver 106 high enough in order to allow third devices to detect the NAV updates in the ACKs 320.

In an embodiment, as shown also in FIG. 4B, the STA 102 may detect, on the basis of the received ACK frame 320, that a set of consecutive data units transmitted data packet have been received correctly. These correctly received MPDUs, marked with white blocks in FIG. 4B, may be present in the beginning of the transmitted PPDU 300. In FIG. 4B, four data units (MPDUs) 301-304 have been received correctly. The STA 102 may then determine a second transmission duration $T_{SUCCESS}$ during which the correctly received set of consecutive data units 301-304 were transmitted.

Thereafter, the STA 102 may set the maximum packet duration at least partly on the basis of the determined second transmission duration $T_{SUCCESS}$. For example, if it has been detected that four MPDUs 301-304 have been correctly received but after that a collision has occurred, the STA 102 may consider that causing the ACK response to be transmitted before the fifth MPDU 305 may allow the other devices to detect the on-going data communication. Thus, the STA 102 may decide to shorten the PPDU duration and set the maximum PPDU duration to a value which corresponds to the transmission time of four MPDUs, i.e. to $T_{SUCCESS}$. To be on the safe side, the STA 102 may set the PPDU duration to a value which is slightly less than the $T_{SUCCESS}$, in order to make sure that other devices detect the ACK carrying the NAV update early enough so that they do not cause any data transmission. This may help avoiding or at least reducing the number of collisions. The target may be that the STA 102 detects an optimal periodicity for the responses from the receiver 106 and transmits, at maximum, PPDUs which make the receiver to reply according to this optimal periodicity.

Figure 6A:
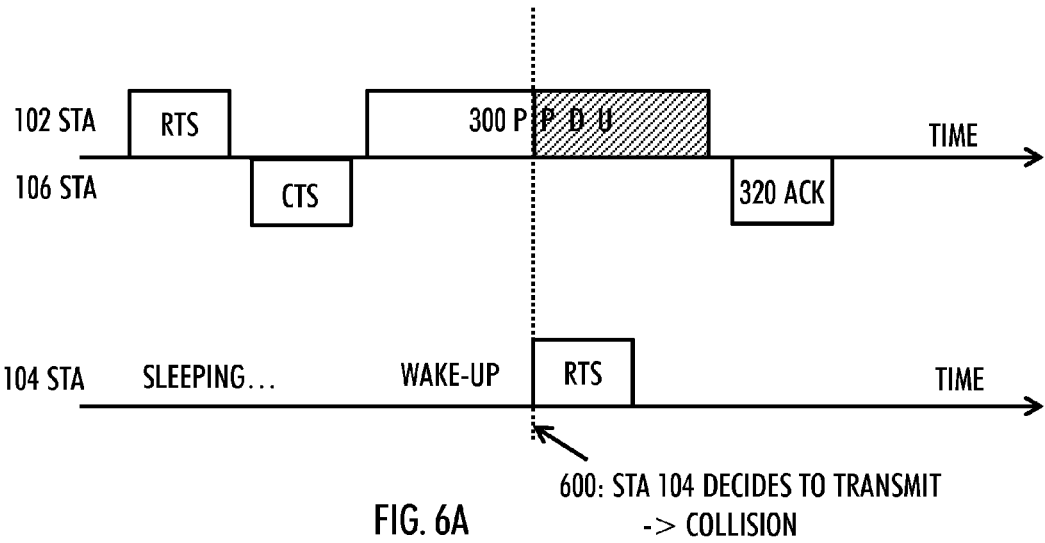
FIGS. 6A and 6B illustrate how a station waking up from a sleep mode may operate, according to some embodiments.

Some of the other devices in the communication system may be devices capable of applying a sleep mode for power saving, such as the STA 104. As shown in FIG. 6A, after the STA 104 wakes up, the STA 104 may decide to start transmitting in the medium if the STA 104 does not receive any information that there is an on-going communication in the channel already. As said earlier, although the NAV information may be transmitted in the PPDU 300, the information may not be easily received by all devices. The ACK or block ACK frame 320 may be more easily detectable by other devices. This is because the ACK 320 may be transmitted in lower throughput leading to more robust transmission. However, in the example of FIG. 6A, the PPDU size applied by the STA 102 is large and the STA 104 waking up from the doze mode may not detect any ACKs 320. As a result, the power saving STA 104 may start transmission (e.g. RTS request being sent) at point 600. This RTS transmission may collide with the on-going data transmission and a portion of the PPDU 300 is not received correctly by the STA 106.

Figure 5:
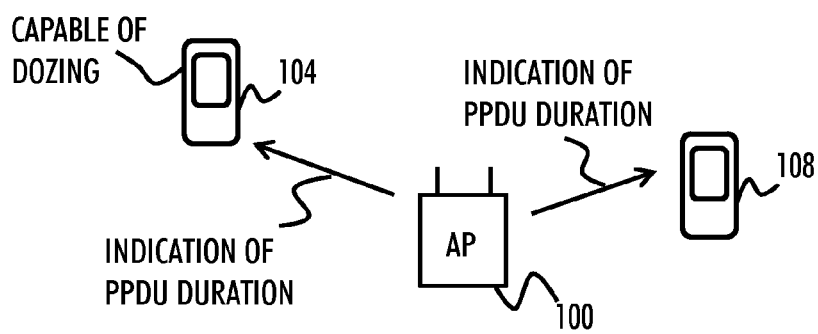
FIG. 5 depicts a scenario where an access node controls transmits an indication of a maximum packet duration, according to an embodiment.

In order to avoid the collision of FIG. 6A, there is proposed also a mechanism where the AP 100 or another device may coordinate the interval between responses (MDBR) and set a minimum listening time for the power saving STAs 104 after waking from the doze state before starting to obtain a TXOP. Accordingly, in an embodiment, the transmitter may transmit an indication of the maximum packet duration (i.e. an indication of the MDBR) to a group of devices capable of applying a sleep mode for power saving, such as to the STA 104. This is shown in FIG. 5. Although FIG. 5 depicts that the AP 100 transmits the indication in order to improve the transmission reliability and communication efficiency, in another embodiment a non-AP STA, such as the STA 102, may transmit the indication of the MDBR to the group of devices.

In another embodiment, the indication from the AP 100 or from non-AP STA 102 is of a broadcast type and thus detectable by each and every device in the coverage area of the broadcast.

Figure 6B:
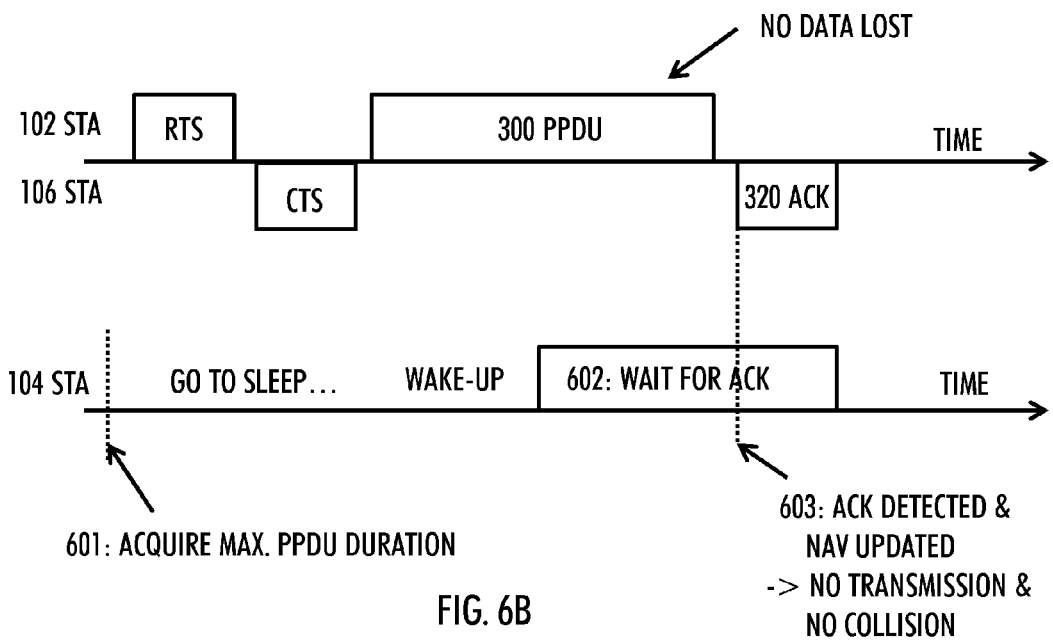

However, let us, for the sake of simplicity, assume that the indication goes to the group of devices capable of applying the sleep mode in step 602, as shown in FIG. 6B. These devices, including the STA 104, may then apply the indicated maximum packet duration (i.e. the MDBR) as a minimum waiting duration 602 before transmitting any data after wake-up from the sleep mode in order to ensure that at least one ACK frame 320 is received. As a result, the STA 104 detects and decodes the ACK 320 from the receiver STA 106 in step 603. In this manner the STA 104 obtains knowledge that there is an on-going communication in the channel and may restrain from transmissions. This may avoid collisions or at least decrease the number of collisions in the wireless access system. Consequently, the STA 104 may, after waking up, start to obtain a TXOP only after the STA 104 has waited for the MDBR duration during which it receives the ACK frame 320, if any relevant on-going communication is present.

Figure 7:
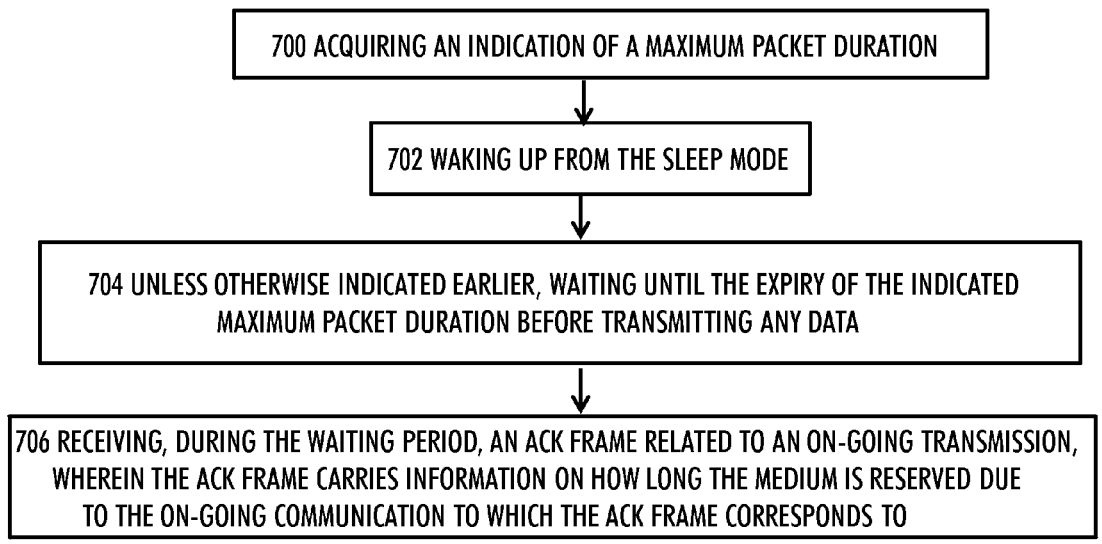
FIG. 7 shows a method, according to an embodiment.

Looking from the point of view of the power saving STA 104, the STA 104 may acquire the indication of the maximum packet duration in step 700 of FIG. 7. In step 702, the STA 104 wakes up from the sleep mode. In step 704, unless otherwise indicated earlier, the STA 104 may wait until the expiry of the indicated maximum packet duration before transmitting any data. Owing to the waiting period, the STA 104 may in step 706 receive the ACK frame related to an on-going transmission during the waiting period, wherein the ACK frame carries the information on how long the medium is reserved due to the on-going communication to which the ACK frame corresponds to. In this way other devices may trust that by transmitting PPDUs 300 with the defined maximum PPDU duration, there will most likely be no distortions in the channel due to transmission from the STAs 104 that are waking up. However, in case the STA 104 receives a frame (preamble) before the end of the MDBR period, the STA 104 may proceed directly to transmission without waiting till the end of the MDBR period.

In one embodiment, the multicast/broadcast of the maximum packet duration is targeted also to other STAs 108, not only to power saving STAs 104. The STA 108 in the role of a transmitter may apply the information in the same manner as the transmitter 102, that is, by allowing the recipient to respond at minimum between the MDBR duration. This may take place by the STA 108 coordinating the number of octets in transmission so as to fulfil the indicated MDBR requirements. This may increase the reliability and the communication efficiency in the system.

In case the multicast/broadcast of the maximum packet duration is made by an AP, such as the AP 100, the AP 100 may include the indication of the maximum packet duration in at least one of the following: an association response, a beacon and a probe response. This may be efficient from the system efficiency point of view so that no extra signaling is needed to inform the maximum packet duration.

In an embodiment, the AP 100, or a non-AP STA, may transmit (e.g. multicast) the indication of the maximum packet duration (MDBR) to a predetermined group of devices applying the same access window for transmission, such as to a group of devices operating within the same Reduced Access Window (RAW). The RAW may be used to allow different devices to access the channel at different times. A target of the RAW may be group devices that are allowed to transmit to the AP 100 at certain times, for example. It may be beneficial that the MDBR is taken into use by a certain group only. This may increase the flexibility of the system.

In an embodiment, the indicated MDBR may be utilized so that the terminals belonging to the predetermined group may allow a receiver of communication to transmit (e.g. to reply with ACK) at maximum after the MDBR delay.

In one embodiment, the indicated MDBR may be utilized so that the power saving STAs 104 that wake from Doze and belong to the predetermined group may transmit only after the MDBR delay, unless an they are allowed to do so earlier by receiving a preamble, for example. Power saving STAs that do not belong to predetermined group may not be allowed to transmit.

In yet one embodiment, the indicated MDBR may be utilized so that the terminals that do not belong to the predetermined group may transmit after the MDBR duration. In this case, the MDBR may be set to a value larger than TXOPLimit in order to allow other STAs to take the unused channel into usage. This may increase the efficiency of the system.

In an embodiment, the AP 100 or a non-AP STA 102 may transmit the MDBR information to an individual address. In case the value is transmitted by a non-AP STA to an AP, the indication of the MDBR is considered by the AP only as a recommendation for the AP. The AP may itself decide whether or not to take the indicated MDBR value into use. For example, if the AP knows that shorter maximum packet duration is used by some other STA, the AP may decide not to follow the suggested MDBR. Moreover, the AP may decide to indicate the shorter MDBR to the STA which suggested the longer MDBR.

In one embodiment, the MDBR (i.e. the maximum packet duration) may be applied by the STA 104 only when unexpected conditions take place. For example, in an embodiment, the STA 104, after waking up, may apply the indicated maximum packet duration as the waiting period only for transmissions taking place at some other time instant than at indicated in a transmission schedule. Thus, normal real-time transmission according to the schedule may be done without additional delays.

Figure 8:
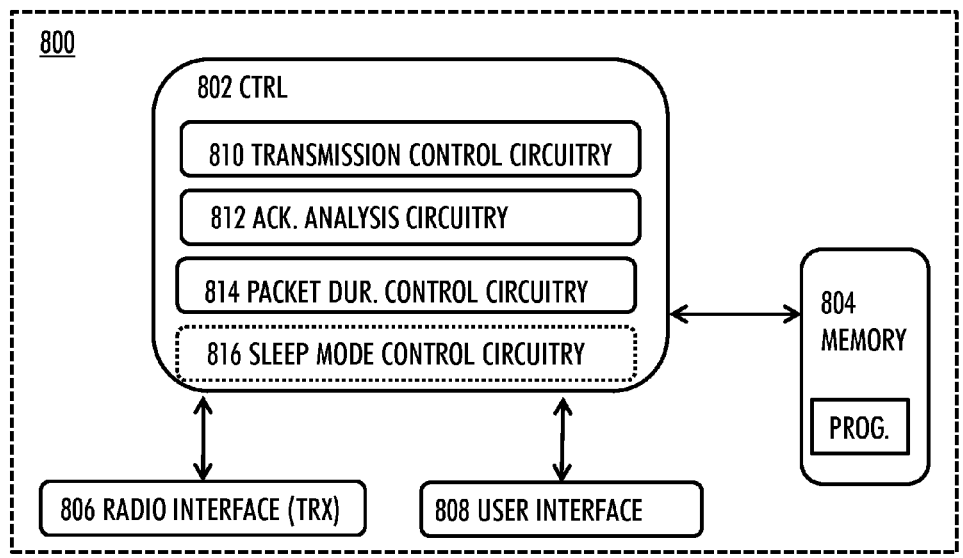
FIG. 8 illustrates an apparatus, according to an embodiment.

An embodiment, as shown in FIG. 8, provides an apparatus 800 comprising a control circuitry (CTRL) 802, such as at least one processor, and at least one memory 804 including a computer program code (PROG), wherein the at least one memory 804 and the computer program code (PROG), are configured, with the at least one processor 802, to cause the apparatus 800 to carry out any one of the described processes. The memory 804 may be implemented using any suitable data storage technology, such as semiconductor based memory devices, flash memory, magnetic memory devices and systems, optical memory devices and systems, fixed memory and removable memory.

In an embodiment, the apparatus 800 may be or be comprised in a terminal device of a wireless access communication system, e.g. a user equipment (e.g. the STA 102), a user terminal (UT), a computer (PC), a laptop, a tabloid computer, a cellular phone, a mobile phone, a communicator, a smart phone, a palm computer, or any other communication apparatus. Further, the apparatus 800 may be or comprise a module (to be attached to a device, such as to the STA 102) providing connectivity, such as a plug-in unit, an "USB dongle", or any other kind of unit. The unit may be installed either inside the device or attached to the device with a connector or even wirelessly. In an embodiment, the apparatus 800 may be or be comprised in a wireless device operating under the IEEE 802.11, for example. In another embodiment, the apparatus 800 may be or be comprised in a network node, such as in an access point or an access node operating under the IEEE 802.11.

The apparatus 800 may further comprise communication interface (TRX) 806 comprising hardware and/or software for realizing communication connectivity according to one or more communication protocols. The TRX 806 may provide the apparatus with communication capabilities to access the wireless radio access network, for example.

The apparatus 800 may also comprise a user interface 808 comprising, for example, at least one keypad, a microphone, a touch display, a display, a speaker, etc. The user interface 808 may be used to control the apparatus 800 by the user.

The control circuitry 802 may comprise a transmission control circuitry 810 for setting the initial PPDU size and for causing the transmission of the PPDU comprising the plurality of MPDUs, for example. An acknowledgment frame analysis circuitry 812 may be for analysing the received ACK frames in order to know which one(s) of the MDPUs of the PPDU were not correctly received by the receiver, for example. A packet duration control circuitry 814 may set the maximum packet duration allowed, according to any of the embodiments.

In case the apparatus 800 is or is comprised in a power saving STA, such as the STA 104, the controller 802 may additionally comprise a sleep mode control circuitry 816 for controlling the dozing and awake periods as well as for controlling the waiting duration before accessing the channel.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method, comprising:
determining, by a transmitter node, maximum packet duration for a data packet to be transmitted, wherein the data packet comprises a plurality of data units;
causing a transmission of the data packet;
causing a reception of an acknowledgement frame indicating a failed reception of multiple consecutive data units of the transmitted data packet;
determining a transmission duration during which the failed multiple consecutive data units were transmitted; and
determining whether or not to adjust the maximum packet duration for upcoming data packet transmissions on the basis of the determined transmission duration.

2. The method of claim 1, further comprising:
upon detecting that the determined transmission duration is lower than a predetermined threshold, maintaining the current value of the maximum packet duration; and
upon detecting that the determined transmission duration is higher than the predetermined threshold, reducing the value of the maximum packet duration.

3. The method of claim 2, wherein the predetermined threshold set to a value which is higher than estimated transmission duration of the acknowledgement frame.

4. The method of claim 1, further comprising:
detecting, on the basis of the received acknowledgment frame, that a set of consecutive data units in the transmitted data packet have been received correctly;
determining a second transmission duration during which the correctly received set of consecutive data units were transmitted; and
setting the maximum packet duration at least partly on the basis of the determined second transmission duration.

5. The method of claim 1, wherein each acknowledgement frame comprises information on how long the medium is reserved due to the on-going communication to which the acknowledgment frame corresponds to, the method further comprising:
causing an indication of the maximum packet duration to a group of devices capable of applying a sleep mode for power saving, wherein the group of devices applies the indicated maximum packet duration as minimum waiting duration before transmitting any data after wake-up from the sleep mode in order to ensure that at least one acknowledgement frame is received.

6. The method of claim 5, further comprising:
including the indication of the maximum packet duration in at least one of the following: an association response, a beacon and a probe response.

7. The method of claim 1, further comprising:
causing a transmission of an indication of the maximum packet duration only to a predetermined group of devices applying the same access window for accessing channel.

8. The method of claim 1, wherein the data packet is a Physical Layer Convergence Procedure Protocol Data Unit, PPDU, and the data unit comprised in the data packet is a MAC Protocol Data Unit, MPDU, of an IEEE 802.11 wireless access network.

9. The method of claim 1, wherein the transmitter node is a user device or an access point of an IEEE 802.11 wireless access network.

10. An apparatus, comprising:
at least one processor and at least one memory including a computer program code, wherein the at least one memory and the computer program code are configured, with the at least one processor, to cause the apparatus at least to:
determine maximum packet duration for a data packet to be transmitted, wherein the data packet comprises a plurality of data units;
cause a transmission of the data packet;
cause a reception of an acknowledgement frame indicating a failed reception of multiple consecutive data units of the transmitted data packet;
determine a transmission duration during which the failed multiple consecutive data units were transmitted; and
determine whether or not to adjust the maximum packet duration for upcoming data packet transmissions on the basis of the determined transmission duration.

11. The apparatus of claim 10, wherein the at least one memory and the computer program code are configured, with the at least one processor, to cause the apparatus further to:
upon detecting that the determined transmission duration is lower than a predetermined threshold, maintain the current value of the maximum packet duration; and
upon detecting that the determined transmission duration is higher than the predetermined threshold, reduce the value of the maximum packet duration.

12. The apparatus of claim 11, wherein the predetermined threshold set to a value which is higher than estimated transmission duration of the acknowledgement frame.

13. The apparatus of claim 10, wherein the at least one memory and the computer program code are configured, with the at least one processor, to cause the apparatus further to:
detect, on the basis of the received acknowledgment frame, that a set of consecutive data units in the transmitted data packet have been received correctly;
determine a second transmission duration during which the correctly received set of consecutive data units were transmitted; and
set the maximum packet duration at least partly on the basis of the determined second transmission duration.

14. The apparatus of claim 10, wherein each acknowledgement frame comprises information on how long the medium is reserved due to the on-going communication to which the acknowledgment frame corresponds to, and wherein the at least one memory and the computer program code are configured, with the at least one processor, to cause the apparatus further to:
cause an indication of the maximum packet duration to a group of devices capable of applying a sleep mode for power saving, wherein the group of devices applies the indicated maximum packet duration as minimum waiting duration before transmitting any data after wake-up from the sleep mode in order to ensure that at least one acknowledgement frame is received.

15. The apparatus of claim 14, wherein the at least one memory and the computer program code are configured, with the at least one processor, to cause the apparatus further to:
include the indication of the maximum packet duration in at least one of the following: an association response, a beacon and a probe response.

16. The apparatus of claim 10, wherein the at least one memory and the computer program code are configured, with the at least one processor, to cause the apparatus further to:
cause a transmission of an indication of the maximum packet duration only to a predetermined group of devices applying the same access window for accessing channel.

17. The apparatus of claim 10, wherein the data packet is a Physical Layer Convergence Procedure Protocol Data Unit, PPDU, and the data unit comprised in the data packet is a MAC Protocol Data Unit, MPDU, of an IEEE 802.11 wireless access network.

18. The apparatus of claim 10, wherein the apparatus is a user device or an access point of an IEEE 802.11 wireless access network.

19. A non-transitory computer readable medium embodying at least one computer program code, the at least one computer program code executable by at least one processor to perform operations comprising:
determining maximum packet duration for a data packet to be transmitted, wherein the data packet comprises a plurality of data units;
causing a transmission of the data packet;
causing a reception of an acknowledgement frame indicating a failed reception of multiple consecutive data units of the transmitted data packet;
determining a transmission duration during which the failed multiple consecutive data units were transmitted; and
determining whether or not to adjust the maximum packet duration for upcoming data packet transmissions on the basis of the determined transmission duration.

* * * * *